US008376549B2

(12) United States Patent
Seo et al.

(10) Patent No.: US 8,376,549 B2
(45) Date of Patent: Feb. 19, 2013

(54) LASER PROJECTION DISPLAY AND IMAGE DISTORTION CORRECTION METHOD FOR THE SAME

(75) Inventors: Jung Hoon Seo, Seoul (KR); Jung Hwan Choi, Seoul (KR); Jae Wook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 12/989,367

(22) PCT Filed: Jul. 20, 2009

(86) PCT No.: PCT/KR2009/003996
§ 371 (c)(1), (2), (4) Date: Oct. 22, 2010

(87) PCT Pub. No.: WO2010/011066
PCT Pub. Date: Jan. 28, 2010

(65) Prior Publication Data

US 2011/0037955 A1 Feb. 17, 2011

(30) Foreign Application Priority Data

Jul. 23, 2008 (KR) ........................ 10-2008-0071589

(51) Int. Cl.

| | |
|---|---|
| ***G03B 21/14*** | (2006.01) |
| ***H04N 3/23*** | (2006.01) |
| ***H04N 3/22*** | (2006.01) |
| ***G06K 9/36*** | (2006.01) |
| ***H01S 3/10*** | (2006.01) |

(52) U.S. Cl. .......... 353/69; 353/121; 348/746; 348/806; 358/3.26; 382/149; 382/275; 372/38.02; 372/24

(58) Field of Classification Search .............. 353/69–70, 353/121; 348/746, 806; 358/3.26; 382/149, 382/275; 372/38.02, 24
See application file for complete search history.

(56) References Cited

U.S. PATENT DOCUMENTS 6,280,037 B1 8/2001 Smith
2005/0286096 A1 * 12/2005 Yoon ............................ 358/483

FOREIGN PATENT DOCUMENTS

| | | |
|---|---|---|
| JP | 2005-223578 A | 8/2005 |
| JP | 2006-186675 A | 7/2006 |
| WO | WO 00/50956 A2 | 8/2000 |

* cited by examiner

*Primary Examiner* — Georgia Y Epps
*Assistant Examiner* — Magda Cruz
(74) *Attorney, Agent, or Firm* — Birch, Stewart, Kolasch & Birch, LLP

(57) ABSTRACT

A laser projection display and a method of compensating for image distortion of the same stereoscopic liquid crystal display device having a touch panel and a method for manufacturing the same are disclosed. Herein, the method includes displaying a picture including a red image, a green image, and a blue image, selecting one of the red image, the green image, and the blue image so as to perform pixel alignment of the picture, calculating pixel coordinate values x+dx and y+dy corresponding to the selected image (herein, x represents the x coordinate value prior to alignment, y represents the y coordinate value prior to alignment, dx represents a varied x coordinate value after alignment, and dy represents a varied y coordinate value after alignment), calculating distortion compensation coordinate values X' and Y' corresponding to the pixel coordinate values x+dx and y+dy, and mapping the distortion compensation values X' and Y', thereby compensating for an image distortion occurring in the selected image.

17 Claims, 6 Drawing Sheets

Optical scanner
104
Driving unit
102
204
206
106
202
First operator
Second operator
Mapping unit
Alignment controller
200
Request signal

LASER PROJECTION DISPLAY AND IMAGE DISTORTION CORRECTION METHOD FOR THE SAME

This application claims the benefit of the Korean Patent Application No. 10-2008-0071589, filed on Jul. 23, 2008, which is hereby incorporated by reference as if fully set forth herein.

BACKGROUND OF THE INVENTION

1. Field of the Invention

The present invention relates to a laser projection display and, more particularly, to a laser projection display and a method of compensating for image distortion of the same that can compensate for image distortion.

2. Discussion of the Related Art

With our rapid advancement into a multimedia society, demands for increased display screens and more enhanced picture quality are also growing. And, along with such increasing demands, high resolution and natural and vivid realization of natural colors have become important and crucial factors in the field of laser projection display.

For the perfect realization of natural colors, using light sources having the highest color purity level, such as laser. Herein, a laser projection display using an optical scanner corresponds to one of the devices that realize images using laser.

The laser projection display realizes images by using an optical scanner in order to scan light rays that are generated from a laser light source.

However, in a general laser projection display, misalignment and image distortion may occur in a picture that is being displayed.

Generally, within an entire image section, in an active area where an actual picture is being displayed, alignment should be realized so that a red image, a green image, and a blue image are matched perfectly. However, if the red image, the green image, and the blue image of the picture that is actually being displayed are misaligned, an image distortion may occur due to such misalignment.

As described above, an image distortion occurs due to optical or mechanical factors of the laser projection display. Most particularly, by projecting light rays respectively generated from a red laser light source, a green laser light source, and a blue laser light source onto a screen through different paths, problems in convergence may occur. In other words, by projecting light rays of different colors through different paths, each of the color images may not be aligned to be matched with one another in a wanted position.

More specifically, distortion of images (or picture) that are being displayed is more likely to occur in displays (or display devices) using an optical scanner, due to characteristics of the optical scanner, structural tolerance in the mechanism, and heating of the mechanism caused by the external (or outside) environment, such as heat.

Therefore, the issue of compensating for image distortion corresponds to one of the most imperative objects of the display devices using optical scanners.

SUMMARY OF THE INVENTION

Accordingly, the present invention is directed to a laser projection display and a method of compensating for image distortion of the same that substantially obviate one or more problems due to limitations and disadvantages of the related art.

Another object of the present invention is to provide a laser projection display and a method of compensating for image distortion of the same that can compensate for the alignment of the images and the image distortion caused by such alignment, by performing pixel alignment for each color image and by simultaneously performing distortion compensation for each color image using distortion compensation functions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of compensating for an image distortion of a laser projection display includes displaying a picture including a red image, a green image, and a blue image, selecting one of the red image, the green image, and the blue image so as to perform pixel alignment of the picture, calculating pixel coordinate values x+dx and y+dy corresponding to the selected image (herein, x represents the x coordinate value prior to alignment, y represents the y coordinate value prior to alignment, dx represents a varied x coordinate value after alignment, and dy represents a varied y coordinate value after alignment), calculating distortion compensation coordinate values X' and Y' corresponding to the pixel coordinate values x+dx and y+dy, and mapping the distortion compensation values X' and Y', thereby compensating for an image distortion occurring in the selected image.

Herein, the distortion compensation coordinate values X' and Y' corresponding to the pixel coordinate values x+dx and y+dy may be calculated by respectively using distortion compensation functions $X'=f(x+dx,y+dy)$, $Y'=g(x+dx,y+dy)$.

Furthermore, the step of selecting one of the red image, the green image, and the blue image so as to perform pixel alignment of the picture, may include receiving a pixel alignment request signal, verifying which one of the red image, the green image, and the blue image is selected as an image that is to be aligned, and, if the image that is to be aligned is selected, aligning the selected image.

Alternatively, the step of selecting one of the red image, the green image, and the blue image so as to perform pixel alignment of the picture, may include receiving a pixel alignment request signal, deciding an alignment order of the red image, the green image, and the blue image, and, based upon the decided alignment order, aligning any one of the red image, the green image, and the blue image.

Furthermore, in the step of deciding an alignment order of the red image, the green image, and the blue image, the alignment order may be decided by any one of a display position of the corresponding image and a display time of the corresponding image.

In another aspect of the present invention, in a laser projection display configured to scan a red image, a green image, and a blue image to a display screen, the laser projection display includes an alignment controller configured to select any one of the red image, the green image, and the blue image, so as to perform pixel alignment of the image in accordance with an external request signal, a first operator configured to operate pixel coordinate values corresponding to the selected image, based upon a control signal of the alignment controller, a second operator configured to operate distortion compensation coordinate values corresponding to the pixel coordinate values operated by the first operator, a mapping unit configured to map the distortion compensation coordinate values operated by the second operator, a driving unit configured to align the selected image in accordance with a control signal of the alignment controller and configured to compensate for an image distortion occurring in the aligned image, thereby generating a drive signal, and an optical scanner configured to be driven by the drive signal.

Herein, the alignment controller may include a receiving unit configured to receive a pixel alignment request signal from a user, an image selection window provider configured to provide an image selection window enabling the user to select an image that is to be aligned, based upon the received pixel alignment request signal, and a controller controlling the first operator and the driving unit, based upon an image selection order.

Alternatively, the alignment controller may include a receiving unit configured to receive a pixel alignment request signal from a user, an alignment order decision unit deciding an alignment order of the red image, the green image, and the blue image, based upon the received pixel alignment request signal, and a controller controlling the first operator and the driving unit, based upon the decided alignment order.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
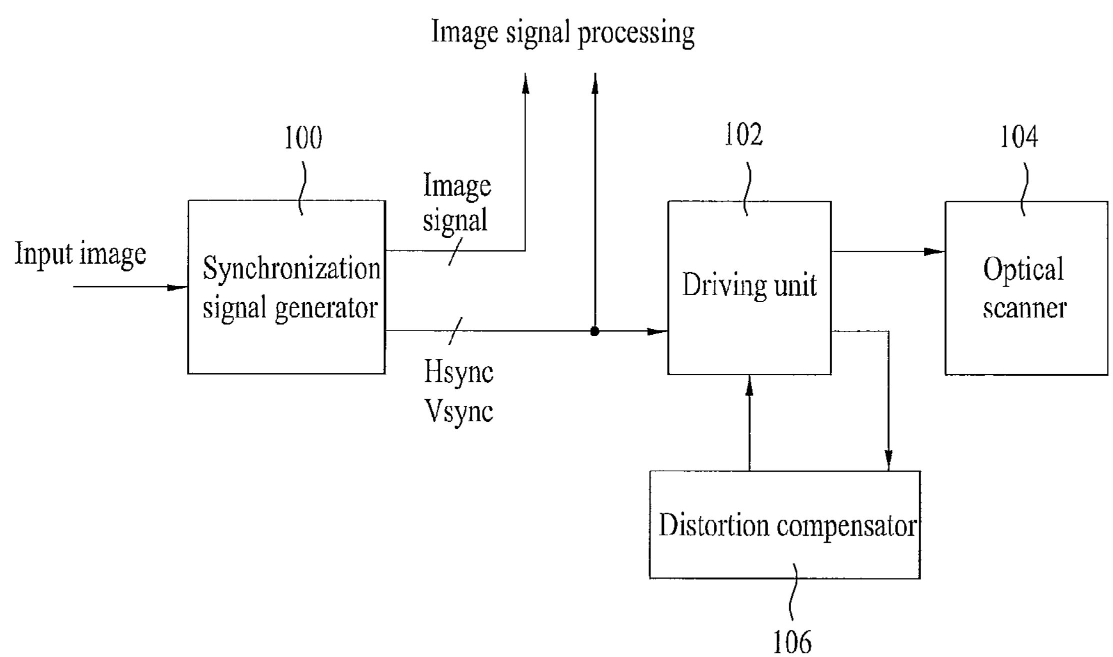
FIG. 1 illustrates a block view showing a laser projection display according to the present invention.

FIG. 1 illustrates a block view showing a laser projection display according to the present invention. As shown in FIG. 1, the laser projection display according to the present invention includes a synchronization signal generator 100, a driving unit 102, an optical scanner 104, and a distortion compensator 106.

Herein, the synchronization signal generator 100 generates horizontal and vertical synchronization signals from an inputted image signal. And, depending upon the generated horizontal and vertical synchronization signals, the driving unit 102 generates a Drive signal for driving the optical scanner 104.

Also, as a micro-electro-mechanical system (MEMS) scanner, the optical scanner 104 resonates in accordance with the received Drive signal, which has a 90-degree phase shift.

Subsequently, the distortion compensator 106 may control the driving unit 102 for the pixel alignment of a respective image. And, at the same time, the distortion compensator 106 may also control the driving unit 102 the distortion compensation of the aligned image.

Herein, the distortion compensator 106 uses distortion compensation functions $X'=f(x,y)$, $Y'=g(x,y)$ (wherein x represents the x coordinate value of a corresponding pixel, and y represents the y coordinate value of the corresponding pixel) so as to calculate the distortion compensated values X' and Y'. Then, by mapping the distortion compensated coordinate values X' and Y', distortion of the image that is to be aligned may be compensated.

Figure 2:
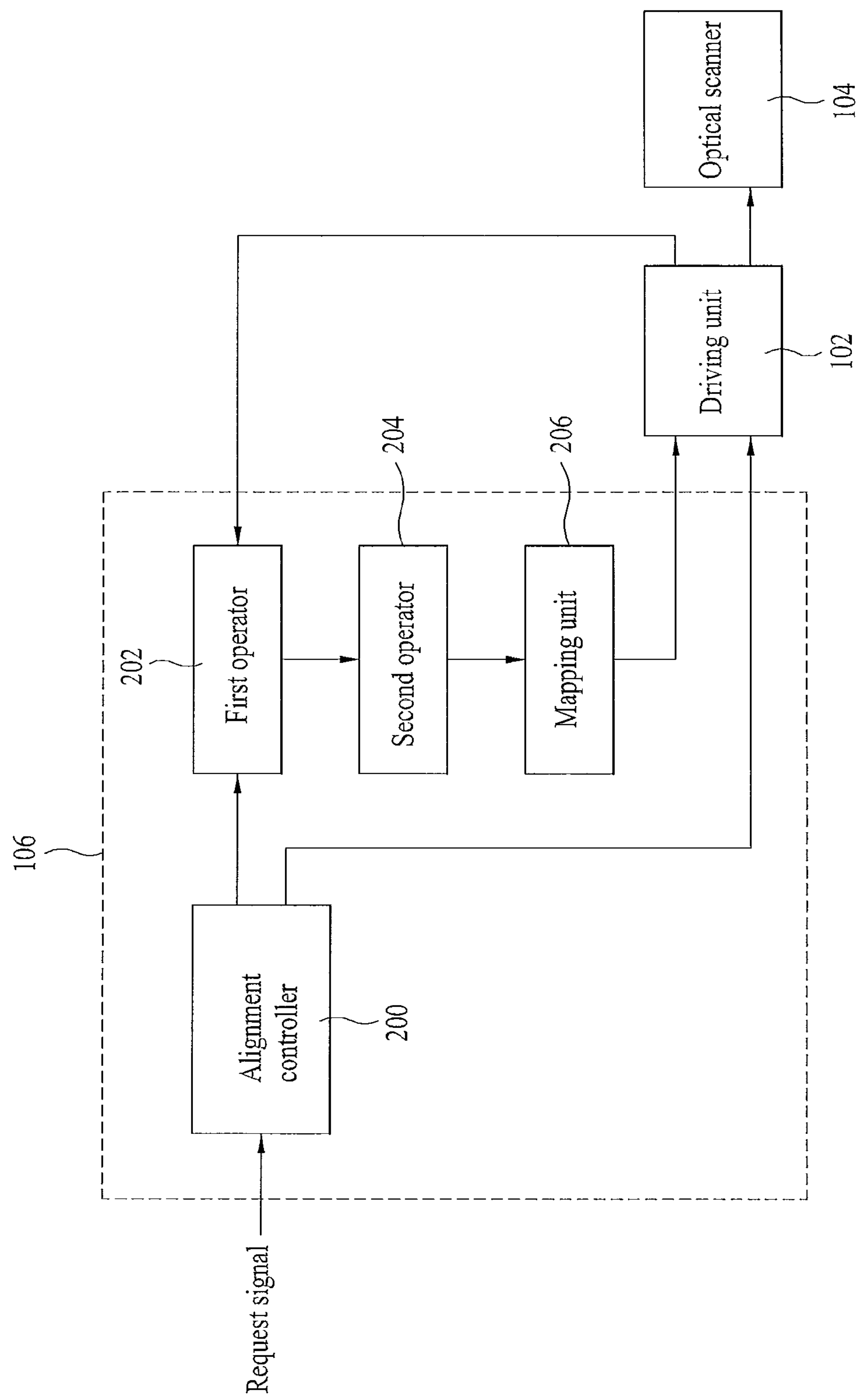
FIG. 2 illustrates a block view of a distortion compensator of FIG. 1.

FIG. 2 illustrates a block detailed view of a distortion compensator of FIG. 1. As shown in FIG. 2, the distortion compensator may include an alignment controller 200, a first operator 202, a second operator 204, and a mapping unit 206.

Herein, in accordance with a request signal generated from an external source, the alignment controller 200 may select any one of a red image, a green image, and a blue image in order to perform pixel alignment of the corresponding image.

More specifically, the alignment controller 200 may be configured in two different types.

The first type corresponds to a manual alignment controller. Herein, when using the manual alignment controller, the user personally selects an image that is to be aligned. Then, the user uses an alignment control button to move the selected image to the active area of the picture displayed on the display screen, thereby performing the alignment process.

Alternatively, the second type corresponds to an automatic alignment controller. When using the automatic alignment controller, the alignment controller automatically decides priority levels of the images that are to be aligned. Then, based upon the decided priority levels, a selected image is moved to the active area of the picture displayed on the display screen, thereby being aligned.

Figure 3:
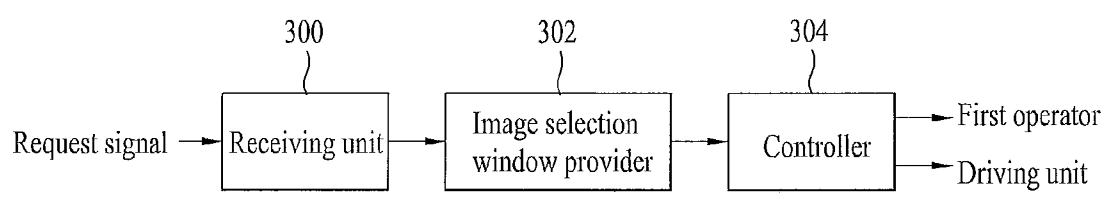
FIG. 3 illustrates a block view of an alignment controller of FIG. 2 according to a first embodiment of the present invention.

FIG. 3 illustrates a block view of a manual alignment controller. As shown in FIG. 3, the alignment controller 200 may include a receiving unit 300, an image selection window provider 302, and a controller 304.

Herein, the receiving unit 300 receives a pixel alignment request signal from the user. Then, after receiving the pixel alignment request signal from the receiving unit 300, the image selection window provider 302 performs the function of providing an image selection window, thereby allowing the user to select the images he (or she) wishes to align.

Finally, depending upon selection order of the images selected by the user, the controller 304 may control the first operator 202 and the driving unit 102.

Figure 4:
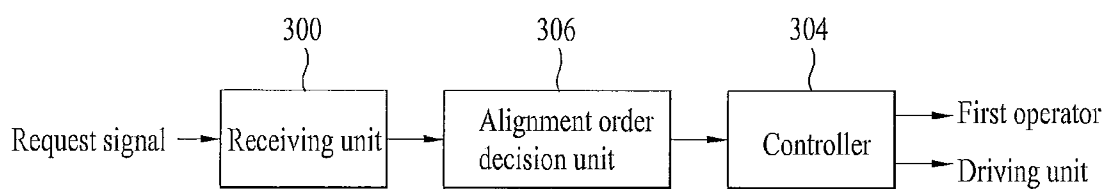
FIG. 4 illustrates a block view of an alignment controller of FIG. 2 according to a second embodiment of the present invention.

FIG. 4 illustrates a block view of an automatic alignment controller. As shown in FIG. 4, the alignment controller 200 may include a receiving unit 300, an alignment order decision unit 306, and a controller 304.

Herein, the receiving unit 300 receives a pixel alignment request signal from the user. Then, after receiving the pixel alignment request signal from the receiving unit 300, the alignment order decision unit 306 decides the alignment order of the red image, the green image, and the blue image.

At this point, the alignment order decision unit 306 may decide the alignment order based upon any one of a display position of the corresponding image and the display time of the image.

More specifically, the alignment order decision unit 306 refers to the horizontal and vertical synchronization signals of the image that is currently being displayed from the Drive signal of the driving unit 102. Thereafter, with respect to the display area, the alignment order decision unit 306 may decide the image positioned closer to the active area to have the highest priority level. Accordingly, the alignment order decision unit 306 may decide the image positioned further apart from the active area to have the lowest priority level.

In other words, since the operation (or calculation) of the distortion compensation coordinate values for the image positioned closer to the active area is performed more quickly than the operation (or calculation) of the distortion compensation coordinate values for the image positioned further apart from the active area, with respect to the driving characteristics of the operator, by performing the faster operations (or calculations) firsthand, the time required for performing the overall operation (or calculation) for the image distortion compensation process may be reduced.

Furthermore, the alignment order decision unit 306 may refer to the Drive signal of the driving unit 102, so as to decide the image being displayed first as the image having the highest priority level and to decide the image being displayed last as the image having the lowest priority level.

More specifically, without having to wait for all of the red image, green image, and blue image to displayed, by beginning the process of calculating the pixel coordinate values with the image that is displayed firsthand, the time required for performing the overall operation (or calculation) for the image distortion compensation process may be reduced.

Subsequently, based upon the decided alignment order, the controller 304 may control the operations of the first operator 202 and the driving unit 102.

Meanwhile, depending upon the control signal of the alignment controller 200, the first operator 202 operates (or calculates) the pixel coordinate values respective to the selected image.

Herein, the first operator 202 refers to the horizontal and vertical synchronization signals from the driving unit 102 and counts the number of pixels included in the selected image, so as to calculate (or operate) the pixel coordinate value x. Similarly, the first operator 202 counts the number of lines included in the selected image, so as to calculate (or operate) the pixel coordinate value y.

Subsequently, the second operator 204 calculates the distortion compensation coordinate values respective to the pixel coordinate values calculated (or operated) by the first operator 202.

Herein, the second operator 204 may use distortion compensation functions $X'=f(x+dx,y+dy)$, $Y'=g(x+dx,y+dy)$ (wherein x represents the x coordinate value prior to alignment, y represents the y coordinate value prior to alignment, dx represents a varied x coordinate value after alignment, and dy represents a varied y coordinate value after alignment) so as to calculate the distortion compensation coordinate values X' and Y'.

Thereafter, the mapping unit 206 may map the distortion compensation coordinate values calculated by the second operator 204.

At this point, the mapping unit 206 may use a coordinate conversion (or modification) algorithm such as a bi-linear interpolation algorithm.

Furthermore, based upon the control signal of the alignment controller 200, the driving unit 102 may generate a Drive signal for aligning the selected image so as to drive the optical scanner 104. Then, the driving unit 102 may generate a Drive signal that can compensate for the distortion of the aligned image, according to the mapped distortion compensation coordinate values, so as to drive the optical scanner 104.

The method of compensating for an image distortion of the laser projection display according to the present invention having the above-described structure will now be described in detail.

Figure 5:
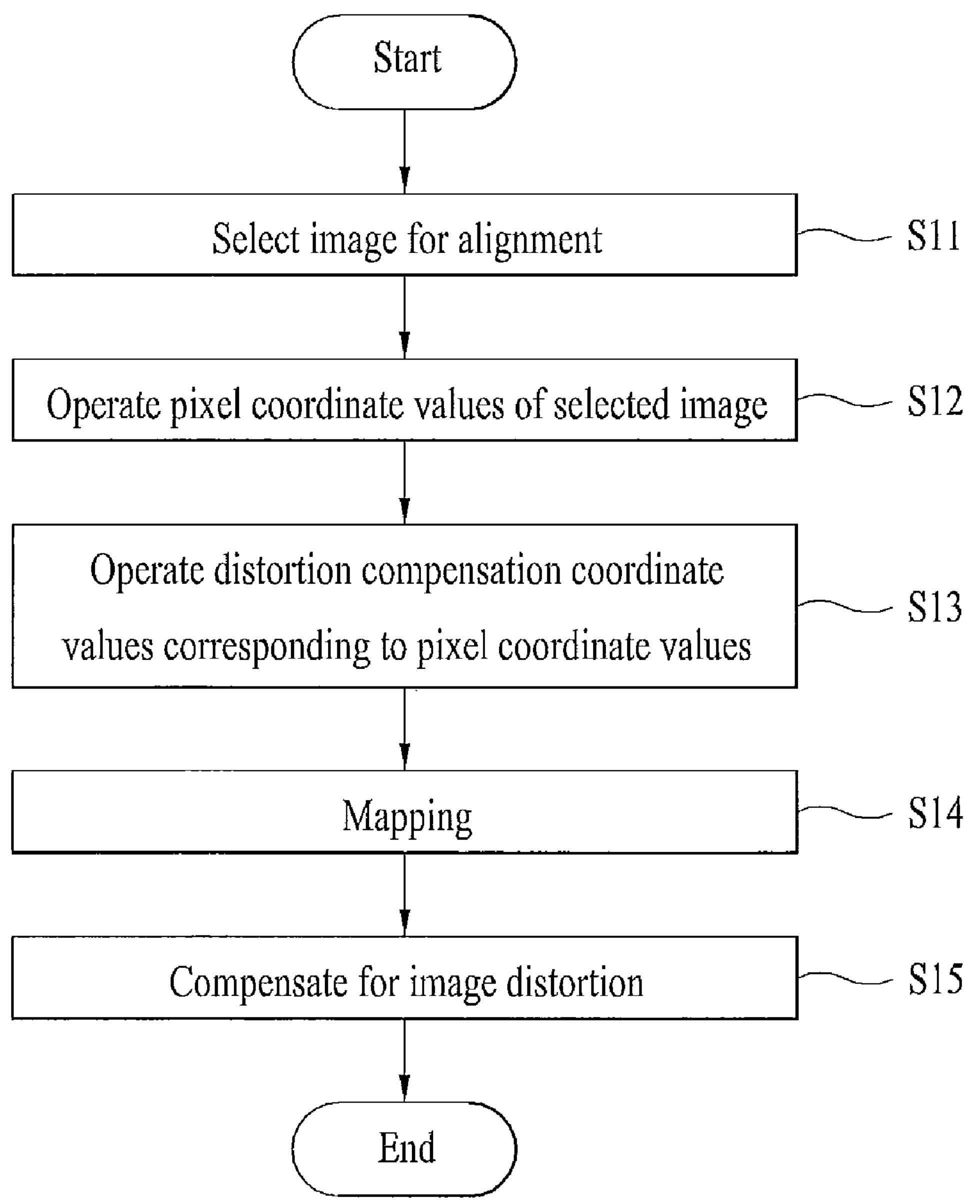
FIG. 5 illustrates flow chart showing the process steps of a method of compensating for an image distortion of the laser projection display according to the present invention.

FIG. 5 illustrates flow chart showing the process steps of a method of compensating for an image distortion of the laser projection display according to the present invention.

As shown in FIG. 5, the synchronization signal generator 100 generates horizontal and vertical synchronization signals of the inputted image. The driving unit 102 generates a Drive signal for driving the optical scanner 104, based upon the generated synchronization signals. And, based upon the Drive signal, the optical scanner 104 displays a picture including a red image, a green image, and a blue image on the display screen.

Thereafter, in order to perform the pixel alignment of the picture, the distortion compensator 106 determines which one of the red image, green image, and blue image has been selected, and, then, the distortion compensator 106 controls the driving unit 102 so as to align the selected image (S11).

Herein, the distortion compensator 106 first receives a pixel alignment request signal from the user through the receiving unit 300. Then, the distortion compensator 106 verifies which one of the red image, green image, and blue image has been selected by the user as the image that is to be displayed, through the window provided by the image selection window provider 302. Thereafter, the distortion compensator 106 controls the driving unit 102 through the controller 304 so that the selected image can be aligned.

Furthermore, according to another embodiment of the present invention, the distortion compensator 106 receives a pixel alignment request signal from the user through the receiving unit 300. Then, the distortion compensator 106 decides the alignment order for the red image, green image, and blue image through the alignment order decision unit 306. Thereafter, depending upon decided alignment order, the distortion compensator 106 controls the driving unit 102 through the controller 304.

At this point, the alignment order may be decided based upon any one of a display position of the corresponding image and a display time of the image.

For example, based upon the positions of the images, the alignment order may be decided so that, within the display area, the image positioned closest to the active area is aligned first. And, alternatively, based upon the timing of the images, the alignment order may be decided so that the image being displayed firsthand can be aligned firsthand as well.

As described above, when the selected image is aligned, an image distortion may occur both horizontally and vertically on the corresponding image that has just been aligned.

Accordingly, the distortion compensator 106 calculates (or operates) pixel coordinate values x and y that are respective to the selected image, through the first operator 202 (S12).

Herein, the first operator 202 may calculate the pixel coordinate values x and y by referring to the horizontal and vertical synchronization signals of the driving unit 202.

The pixel coordinate value x may correspond to the number of pixels, and the pixel coordinate value y may correspond to the number of lines.

Subsequently, the distortion compensator 106 calculates (or operates) pixel coordinate values x+dx and y+dy (wherein x represents the x coordinate value prior to alignment, y represents the y coordinate value prior to alignment, dx represents a varied x coordinate value after alignment, and dy represents a varied y coordinate value after alignment) that are respective to the aligned image, through the second operator 204 (S13).

Herein, the distortion compensation coordinate values X' and Y' respective to pixel coordinate values x+dx and y+dy may be calculated (or obtained) by using the distortion compensation functions X'=f(x+dx,y+dy), Y'=g(x+dx,y+dy).

Subsequently, by using the mapping unit 206, the distortion compensator 106 maps the distortion compensation coordinate values X' and Y' so as to convert the distortion compensation coordinate values.

Herein, the mapping unit 206 may use a coordinate conversion (or modification) algorithm such as a bi-linear interpolation algorithm, so as to map the distortion compensation coordinate values X' and Y'.

Finally, based upon the mapped distortion compensation coordinate values, the driving unit 102 may generate a Drive signal so as to drive the optical scanner 104, thereby being capable of compensating for the distortion of the aligned image.

As described above, by performing pixel alignment for each color image and by simultaneously performing distortion compensation for each color image using distortion compensation functions, the present invention may compensate for the distortion occurring in each color image in accordance with the distortion characteristics of the respective color image.

Figure 6:
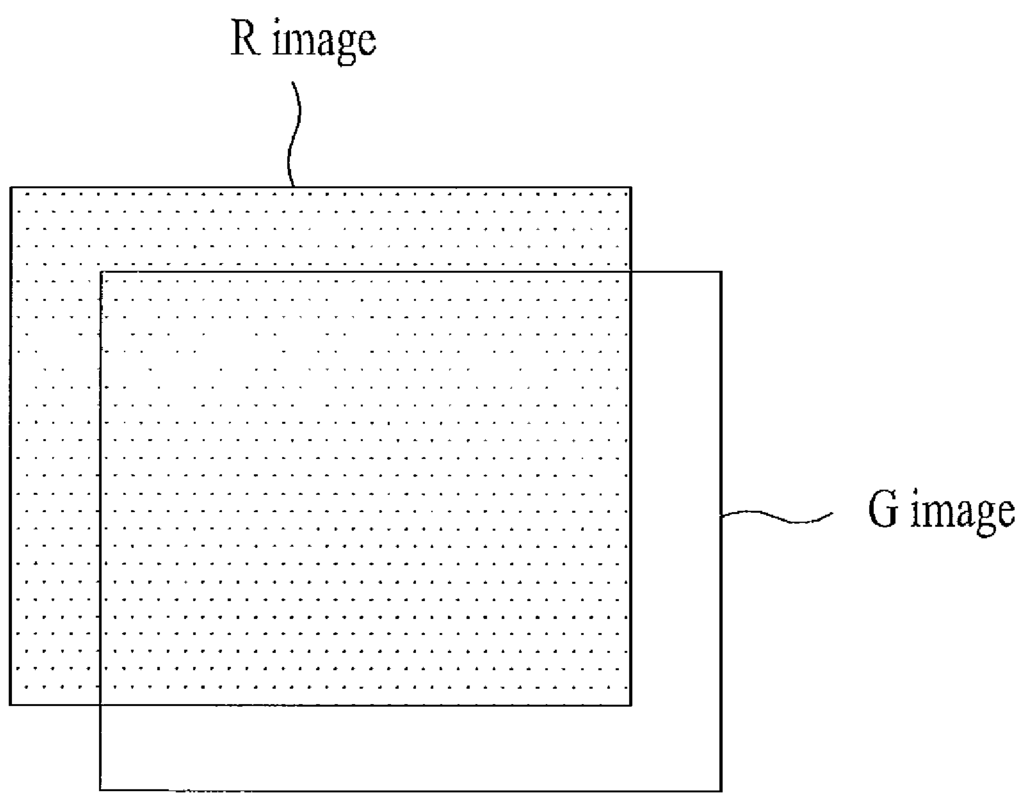
FIG. 6 illustrates an exemplary misalignment of a red image and a green image according to the present invention.
Figure 7:
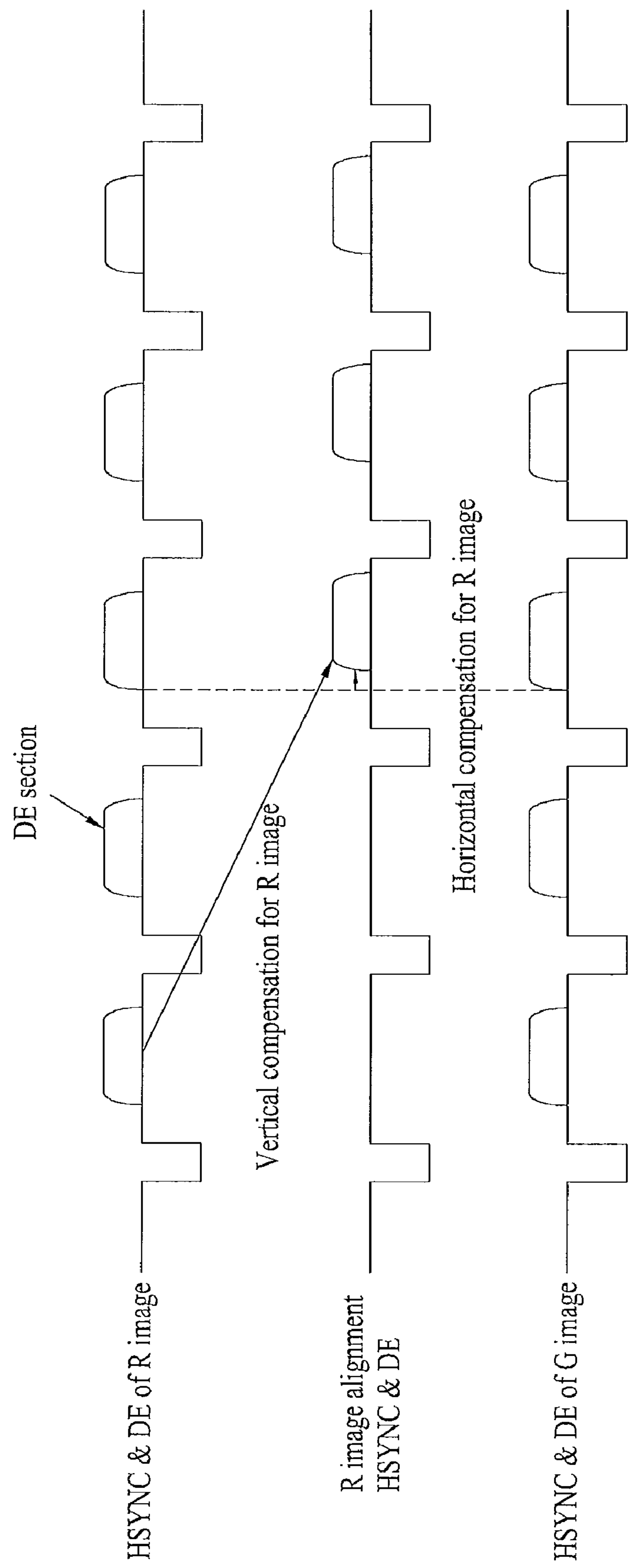
FIG. 7 illustrates a timing diagram showing an alignment compensation of the red image and the green image.

FIG. 6 and FIG. 7 are shown to describe the method of compensating for a distortion in a red image and a green image. More specifically, FIG. 6 illustrates an exemplary misalignment of the red image and the green image according to the present invention. And, FIG. 7 illustrates a timing diagram showing an alignment compensation of the red image and the green image.

As described in FIG. 6 and FIG. 7, when the alignments of the red image and the green image of a picture do not match (i.e., when the red image and the green image of the picture are misaligned), the alignment controller 200 selects the red image to perform the alignment process.

Then, the alignment controller 200 simultaneously controls the driving unit 102 and the first operator 202. And, by using the driving unit 102, the alignment controller 200 moves the red image so that the red image can be aligned with the green image. Thereafter, by using the first operator 202, the alignment controller 200 obtains (or calculates) the pixel coordinate values of the red image.

Subsequently, by using the second operator 204, the alignment controller 200 calculates the distortion compensation coordinate values X' and Y' by using the distortion compensation functions X'=f(x+dx,y+dy), Y'=g(x+dx,y+dy).

Herein, x represents the x coordinate value prior to alignment, and y represents the y coordinate value prior to alignment. Also, dx represents a varied x coordinate value after alignment, and dy represents a varied y coordinate value after alignment.

As described above, when the calculated distortion compensation coordinate values are converted (or modified) by a mapping process, the distortion occurring in the red image may be compensated.

In other words, as shown in FIG. 7, in order to align the red image, the alignment controller 200 may vertically and horizontally delay data enable sections of the red image.

Therefore, image distortion may occur both vertically and horizontally in the aligned red image.

Accordingly, the present invention may compensate for the image distortion occurring in the aligned red image by using the distortion compensation coordinate values operated (or calculated) by using distortion compensation functions.

Meanwhile, by using the alignment controller, the distortion compensator according to the present invention may decide one of the red image, green image, and blue image, which configure a picture, as a reference image. And, the remaining 2 images may be decided as first and second comparative images.

Then, the distortion compensator may control the driving unit so that the first and second images can respectively be aligned with the reference image.

Subsequently, in order to compensate for the image distortion that occurs by aligning the first and second comparative image, the distortion compensator may control the first and second operators and the mapping unit, so as to compute (or calculate) image distortion compensation values using distortion compensation functions.

As described above, the laser projection display and the method of compensating for image distortion of the same have the following advantages.

When the present invention performs pixel alignment for each color image, and when image distortion occurs in each color image due to the pixel alignment process, the present invention uses distortion compensation functions so as to compensate for the image distortion occurring in each color image and to perform the alignment process at the same time.

Accordingly, since the present invention can simply and conveniently perform alignment and perform distortion compensation in accordance with such alignment, a complex circuit is not required to be implemented in the present invention.

Furthermore, the present invention may be applied in a laser projection display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of compensating for an image distortion of a laser projection display, comprising:

- displaying a picture including a red image, a green image, and a blue image;
- selecting one of the red image, the green image, and the blue image so as to perform pixel alignment of the picture;
- calculating pixel coordinate values x+dx and y+dy corresponding to the selected image (herein, x represents the x coordinate value prior to alignment, y represents the y coordinate value prior to alignment, dx represents a varied x coordinate value after alignment, and dy represents a varied y coordinate value after alignment);
- calculating distortion compensation coordinate values X' and Y' corresponding to the pixel coordinate values x+dx and y+dy; and
- mapping the distortion compensation values X' and Y', thereby compensating for an image distortion occurring in the selected image.

2. The method of claim 1, wherein the distortion compensation coordinate values X' and Y' corresponding to the pixel coordinate values x+dx and y+dy are calculated by respectively using distortion compensation functions X'=f(x+dx,y+dy), Y'=g(x+dx,y+dy).

3. The method of claim 1, wherein, in the step of compensating for an image distortion occurring in the selected image, a coordinate conversion algorithm is used for mapping the distortion compensation coordinate values X' and Y'.

4. The method of claim 3, wherein the coordinate conversion algorithm corresponds to a bi-linear interpolation algorithm.

5. The method of claim 1, wherein the step of selecting one of the red image, the green image, and the blue image so as to perform pixel alignment of the picture, comprises:

receiving a pixel alignment request signal;

verifying which one of the red image, the green image, and the blue image is selected as an image that is to be aligned; and if the image that is to be aligned is selected, aligning the selected image.

6. The method of claim 1, wherein the step of selecting one of the red image, the green image, and the blue image so as to perform pixel alignment of the picture, comprises:

receiving a pixel alignment request signal;

deciding an alignment order of the red image, the green image, and the blue image; and based upon the decided alignment order, aligning any one of the red image, the green image, and the blue image.

7. The method of claim 6, wherein, in the step of deciding an alignment order of the red image, the green image, and the blue image, the alignment order is decided by any one of a display position of the corresponding image and a display time of the corresponding image.

8. The method of claim 7, wherein the alignment order first aligns an image positioned closest to an active area within a display area, based upon the display positions of the images.

9. The method of claim 7, wherein the alignment order first aligns an image being displayed first (i.e., earlier than any other images), based upon the display time of the images.

10. The method of claim 1, wherein the pixel coordinate value x corresponds to a number of pixels, and wherein the pixel coordinate value y corresponds to a number of lines.

11. In a laser projection display configured to scan a red image, a green image, and a blue image to a display screen, the laser projection display comprises:

an alignment controller configured to select any one of the red image, the green image, and the blue image, so as to perform pixel alignment of the image in accordance with an external request signal;

a first operator configured to operate pixel coordinate values corresponding to the selected image, based upon a control signal of the alignment controller;

a second operator configured to operate distortion compensation coordinate values corresponding to the pixel coordinate values operated by the first operator;

a mapping unit configured to map the distortion compensation coordinate values operated by the second operator;

a driving unit configured to align the selected image in accordance with a control signal of the alignment controller and configured to compensate for an image distortion occurring in the aligned image, thereby generating a drive signal; and an optical scanner configured to be driven by the drive signal.

12. The laser projection display of claim 11, wherein the alignment controller comprises:

a receiving unit configured to receive a pixel alignment request signal from a user;

an image selection window provider configured to provide an image selection window enabling the user to select an image that is to be aligned, based upon the received pixel alignment request signal; and a controller controlling the first operator and the driving unit, based upon an image selection order.

13. The laser projection display of claim 11, wherein the alignment controller comprises:

a receiving unit configured to receive a pixel alignment request signal from a user;

an alignment order decision unit deciding an alignment order of the red image, the green image, and the blue image, based upon the received pixel alignment request signal; and a controller controlling the first operator and the driving unit, based upon the decided alignment order.

14. The laser projection display of claim 13, wherein the alignment order decision unit decides the alignment order based upon positions of the images closest to an active area within a display area.

15. The laser projection display of claim 13, wherein the alignment order decision unit decides the alignment order based upon the images being displayed first (i.e., based upon a display order of the corresponding images).

16. The laser projection display of claim 11, wherein the first operator operates a pixel coordinate value x by counting a number of pixels included in the selected image, and wherein the first operator operates a pixel coordinate value y by counting a number of lines included in the selected image.

17. The laser projection display of claim 11, wherein the second operator operates the distortion compensation coordinate values X' and Y' by using distortion compensation functions X'=f(x+dx,y+dy), Y'=g(x+dx,y+dy), and wherein x represents the x coordinate value prior to alignment, y represents the y coordinate value prior to alignment, dx represents a varied x coordinate value after alignment, and dy represents a varied y coordinate value after alignment.

* * * * *